United States Patent
Fraser et al.

(10) Patent No.: US 6,899,140 B2
(45) Date of Patent: May 31, 2005

(54) FLEXIBLE PIPE AND METHOD OF MANUFACTURING SAME USING METAL REINFORCED TAPE

(75) Inventors: Dana J. Fraser, Panama City, FL (US); Colin Soens, Steel (GB)

(73) Assignee: Wellstream International Limited, Newcastle upon Tyne (GB)

(*) Notice: Subject to any disclaimer, the term of this patent is extended or adjusted under 35 U.S.C. 154(b) by 0 days.

(21) Appl. No.: 10/217,849

(22) Filed: Aug. 12, 2002

(65) Prior Publication Data

US 2004/0025953 A1 Feb. 12, 2004

(51) Int. Cl.$^7$ .............................................. F16L 11/00
(52) U.S. Cl. ........................ 138/134; 138/143; 138/133; 138/174; 138/129; 138/130; 156/143
(58) Field of Search .................... 138/133, 134, 138/174, 129, 130, 144, 143, 132, 172; 156/143, 187, 190, 193, 195, 244.13

(56) References Cited

U.S. PATENT DOCUMENTS

| | | | | |
|---|---|---|---|---|
| 1,601,092 A | * | 9/1926 | Weigel .......................... | 138/133 |
| 2,722,263 A | * | 11/1955 | Beare et al. ................. | 156/143 |
| 3,211,599 A | * | 10/1965 | Brown et al. ................ | 156/143 |
| 3,506,040 A | * | 4/1970 | Everling et al. ............. | 138/130 |
| 3,559,693 A | * | 2/1971 | Reynard et al. ............. | 138/133 |
| 3,729,028 A | * | 4/1973 | Horvath et al. .............. | 138/130 |
| 3,846,202 A | * | 11/1974 | Clarke .......................... | 156/143 |
| 3,858,617 A | * | 1/1975 | Takada ......................... | 138/141 |
| 3,890,181 A | * | 6/1975 | Stent et al. ................... | 156/143 |
| 4,104,097 A | * | 8/1978 | Gregory et al. .............. | 156/143 |
| 4,213,485 A | * | 7/1980 | Ottewell et al. ............. | 138/130 |
| 4,241,763 A | * | 12/1980 | Antal et al. .................. | 138/127 |
| 4,294,636 A | * | 10/1981 | Vitellaro ....................... | 156/143 |
| 4,351,364 A | * | 9/1982 | Cocks ........................... | 138/133 |
| 4,402,346 A | * | 9/1983 | Cheetham et al. ........... | 138/129 |
| 4,585,035 A | * | 4/1986 | Piccoli .......................... | 138/127 |
| 4,588,461 A | * | 5/1986 | Braun ........................... | 156/143 |
| 4,657,049 A | * | 4/1987 | Fourty et al. ................. | 138/133 |
| 5,269,349 A | * | 12/1993 | Sugier et al. ................. | 138/172 |
| 5,698,278 A | * | 12/1997 | Emond et al. ............... | 428/34.5 |
| 6,085,799 A | * | 7/2000 | Kodaissi et al. ............. | 138/135 |
| 6,363,974 B1 | | 4/2002 | Perez et al. ................... | 138/130 |
| 6,446,672 B1 | * | 9/2002 | Kalman et al. .............. | 138/127 |
| 6,474,366 B2 | * | 11/2002 | Bruno ........................... | 138/134 |

* cited by examiner

Primary Examiner—Patrick Brinson
(74) Attorney, Agent, or Firm—Klarquist Sparkman LLP (57) ABSTRACT

A flexible pipe and a method of manufacturing same according to which a tubular sheath is provided that defines a longitudinal passage for receiving a conveyed fluid, a tape is formed by a plurality of metal fibers supported by a strip of flexible material to form a tape, and the tape is wound around the sheath.

27 Claims, 7 Drawing Sheets

Embedding metal fibers 12 by pulling fibers through extruder and applying molten plastic to fibers to form tape 30

↓

Winding tape 30 around sheath 22

FLEXIBLE PIPE AND METHOD OF MANUFACTURING SAME USING METAL REINFORCED TAPE

BACKGROUND

This disclosure relates generally to a flexible pipe and a method of manufacturing a flexible pipe using metal reinforced tape.

Flexible pipes, hoses, and conduits for accommodating fluids at relatively high pressures often include an extruded inner layer, a plurality of reinforcing fibers extending over the inner layer, and an extruded outer sheath. The reinforcing fibers are typically braided or woven together and are generally formed by extruded polymers, graphite, or glass with high tensile strength. However, these types of reinforcing fibers have limitations, since the fibers are relatively expensive and brittle, and tend to degrade with pressure, temperature, vibration, or exposure to chemicals. Also, relatively large and expensive braiding and armoring machines are required to manufacture the pipe, due to the large numbers of fibers that must be precisely applied.

Therefore, what is needed is a flexible pipe, and a method of manufacturing same, that overcome the problems set forth above.

DETAILED DESCRIPTION

Figure 1:
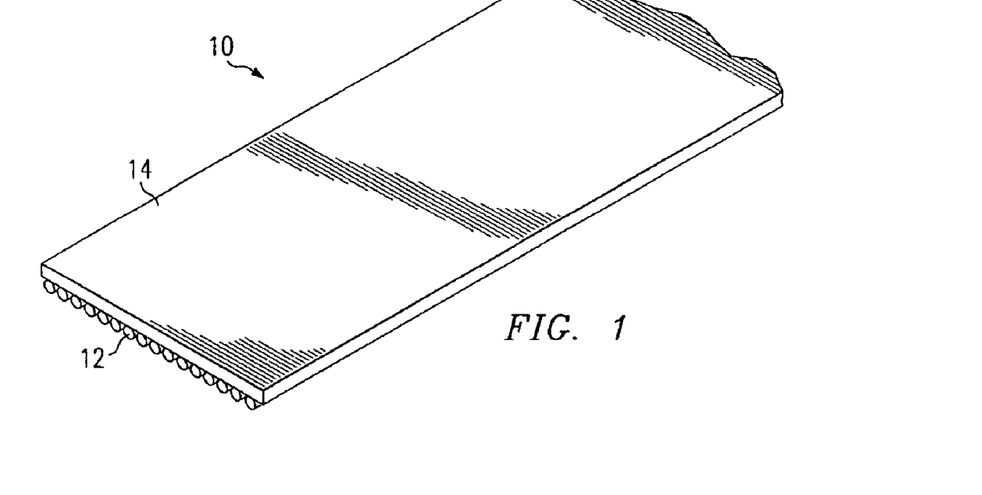
FIG. 1 is a partial isometric view of a tape utilized in a pipe according to an embodiment of the present invention.

As shown in FIG. 1, a tape 10 is provided that is formed by a plurality of metallic fibers, threads, or wires (hereinafter referred to as "fibers") 12 bonded to the lower, or inner, surface of a flexible elongated strip 14. The fibers 12 can be formed by steel, or other similar materials, such as stainless steel, aluminum, beryllium, or copper alloys. Moreover, the fibers 12 can be coated as appropriate to improve corrosion resistance, such as by a conventional galvanizing process utilizing zinc, or another similar metal.

The strip 14 can be formed by one of a variety of materials, an example of which is a polymer, such as polyethylene or polypropylene, in the form of a relatively wide sheet which is cut, or slit, to form the strip 14. The metallic fibers 12 are substantially oriented along the axial, or longitudinal, direction of the strip 14 so that the tape 10 is relatively strong in tension.

Figure 2:
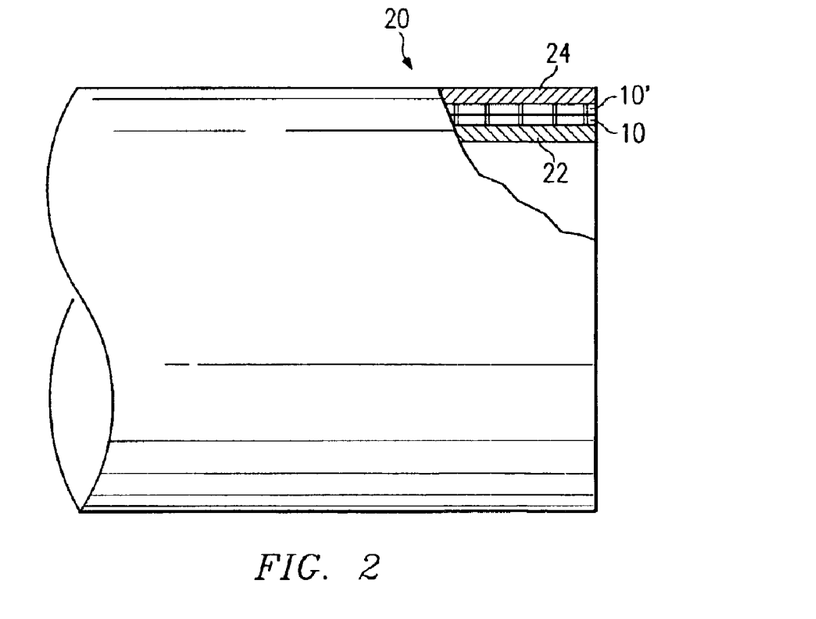
FIG. 2 is a partial elevational/partial cross-sectional view of a pipe incorporating the tape of FIG. 1.

As shown in FIG. 2, the tape 10 is incorporated in a tubular pipe referred to, in general, by the reference numeral 20. The pipe 20 is formed by an inner impervious tubular polymeric sheath 22 for containing the fluid in the pipe. The tape 10 of the embodiment of FIG. 1 is helically wrapped around the sheath 22, and an additional tape 10', which is identical to the tape 10, is helically wrapped around the tape 10. The tape 10' is wrapped in an opposite direction to that of the tape 10, and both tapes extend for the entire length of the sheath 22.

An outer sheath 24 is formed over the outer tape 10' and can be of the composition disclosed in applicant's co-pending U.S. patent application Ser. No. 60/335,518, filed Oct. 31, 2001, the disclosure of which is incorporated by reference.

Figure 3:
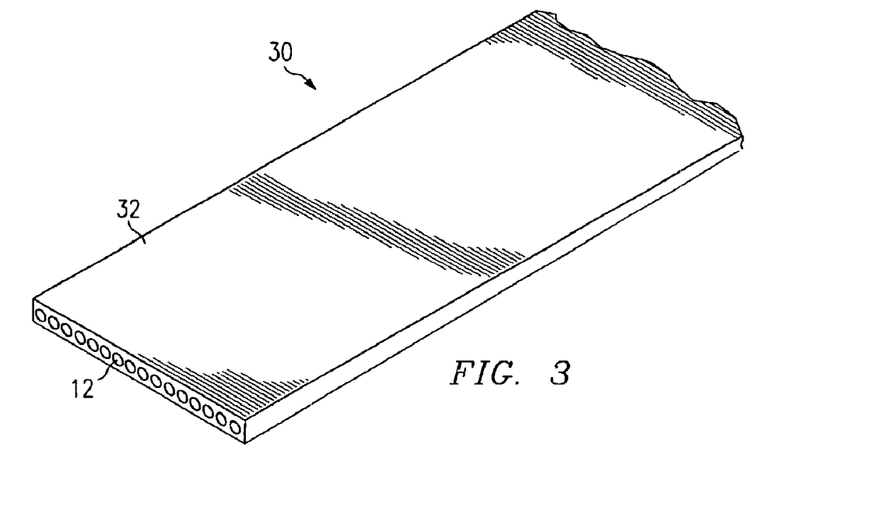
FIGS. 3 and 4 are partial isometric views of alternate embodiments of a tape that can be used in the pipe of FIG. 2.

FIG. 3 depicts another tape 30 that can be used in the pipe 20 of FIG. 2. The tape 30 consists of the metallic fibers 12 of the embodiment of FIG. 2 embedded in a matrix strip 32 of a polymer material, such as polyethylene. The dimensions of the matrix strip 32 are such that a relatively flexible tape is formed, i.e., the length of the strip is considerably larger than its width and the thickness is relatively small when compared to the width. The metallic fibers 12 are substantially oriented along the axial, or longitudinal, direction of the matrix strip 32 so that the tape 30 is relatively strong in tension.

Figure 7:
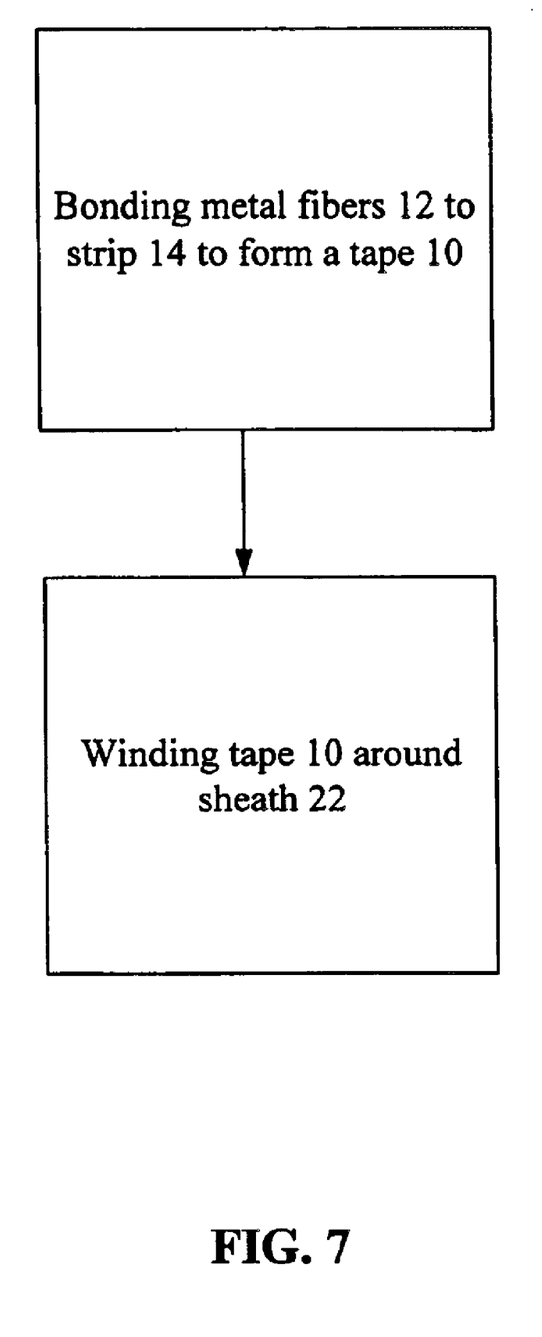
FIG. 7 is a flow chart illustrating a method of manufacturing a flexible pipe, according to one embodiment.

FIG. 7, for example, is a flow chart illustrating a method of manufacturing the pipe 20, according to one embodiment. The method includes bonding the metal fibers 12 to the strip 14 to form the tape 10. The tape 10 is then wound around the sheath 22.

Preferably the tape 30 is non-wetted, that is, the matrix strip holds onto the fibers solely due to friction between the fibers 12 and the matrix strip 32 and the tensile stiffness of the tape 30 is due, in large, to the fibers which are relatively long. However, it is understood that the tape 30 could be wetted, in which case the fibers 12 could be relatively short and the wetted matrix strip 32 would bond to and tie the fibers together to provide substantial stiffness to the tape.

Figure 8:
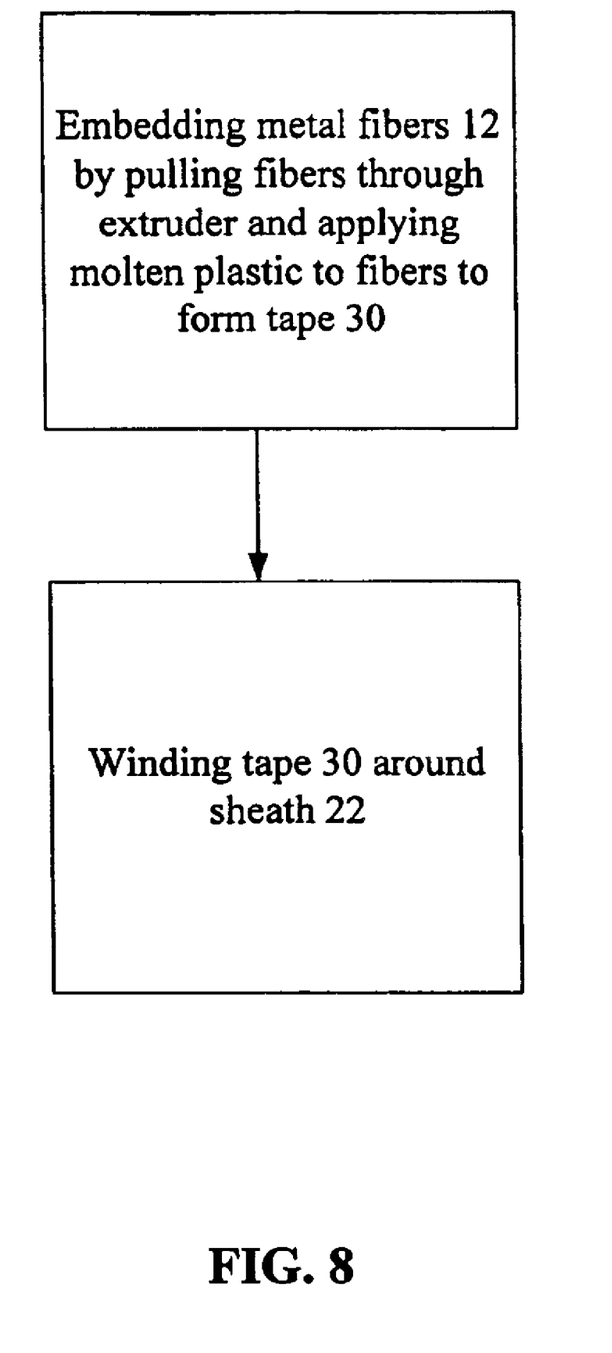
FIG. 8 is a flow chart illustrating a method of manufacturing a flexible pipe, according to another embodiment.

As shown in FIG. 8, a preferred method of manufacturing the tape 30 is pultrusion, according to which the fibers 12 are pulled through an extruder, while the extruder applies the polymer to the fibers to farm the matrix strip 32. The extruded tape 30 can then be helically wound onto the sheath 22. Of course, in this procedure, tools and/or fixtures would be provided to control the size and shape of the finished extrudate.

It is understood that the tapes 10 and/or 10' of FIG. 2 could be replaced by the tape 30 of FIG. 3 (as described in the method of FIG. 8), and another tape, identical to tape 30, could be provided that is wound over the tape 30 in an opposite direction to the direction of winding of the tape 30. Alternatively, one or more tapes 30 could be added as additional layers to the tapes 10 and/or 10' in the pipe 20 of FIG. 2.

Figure 4:
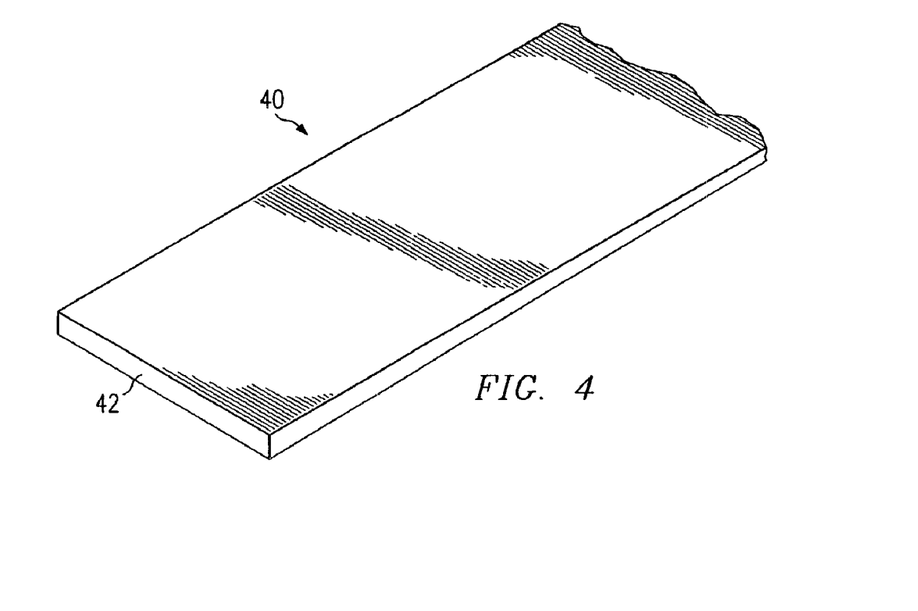
Figure 5:
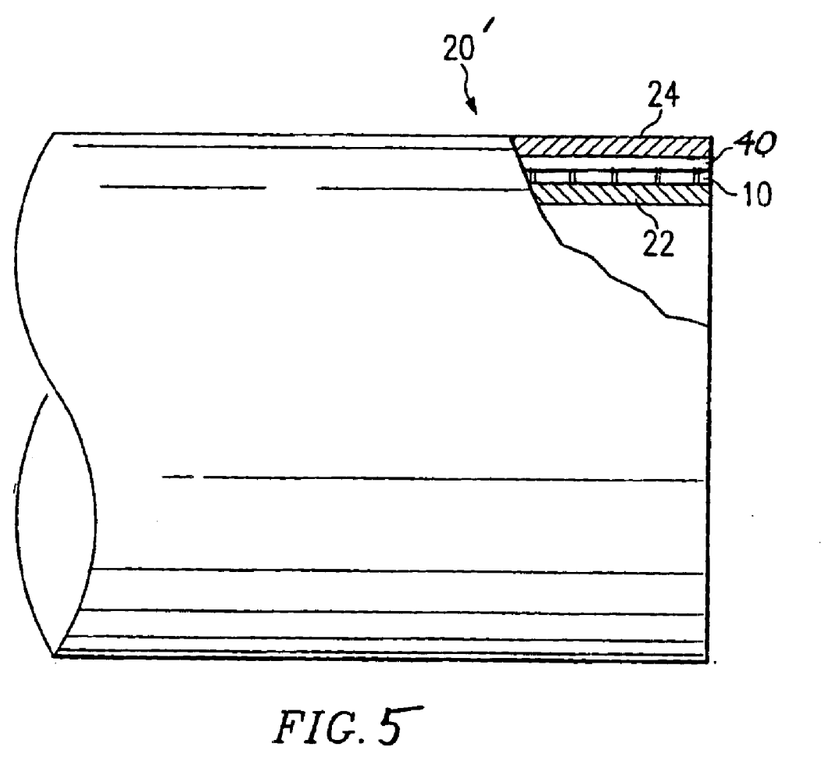
FIG. 5 is a view similar to that of FIG. 2, but depicting an alternate embodiment of a pipe.
Figure 6:
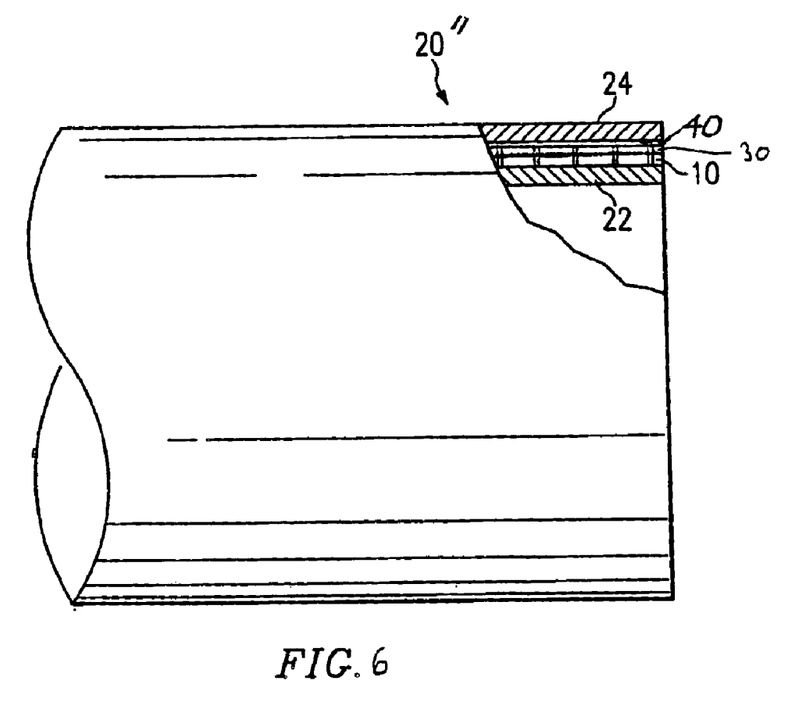
FIG. 6 is a view similar to that of FIG. 2, but depicting yet another embodiment of a pipe.

FIG. 4 depicts another tape 40 that can be used in the pipe 20 of FIG. 2 and that is in the form of a metal strip 42 the dimensions of which are such that it forms a flexible tape. In particular, the length of the strip 42 is considerably larger than its width, while its thickness is relatively small when compared to its width. The strip 42 can be formed of carbon steel but other metals, such as stainless steel, aluminum, beryllium, or copper alloys can be used. Moreover, the strip 42 can be coated as appropriate to improve corrosion resistance, such as by a conventional galvanizing process utilizing zinc, or another similar metal. It is understood that the tapes 10 and/or 10' of FIG. 2 could be replaced by the tape 40 of FIG. 4. For example, FIG. 5 depicts a pipe 20' which is identical to the pipe 20 of FIG. 2 with the exception that the tape 10' of FIG. 2 has been replaced by the tape 40 of FIG. 4. Also, another tape identical to tape 40 could be provided that is wound over the tape 40, either in the same direction, or in an opposite direction to the direction of winding of the tape 40. Alternatively, one or more tapes 40 could be added as additional layers to the tapes 10 and/or 10' and/or the tape or tapes 30 in the pipe 20 of FIG. 2. For example. FIG. 6 depicts a pipe 20", which is identical to the pipe 20' of FIG. 5 with the exception that the tape 30 of FIG. 3 is wound over the tape 10 and the tape 40 is wound over the tape 30.

Figure 9:
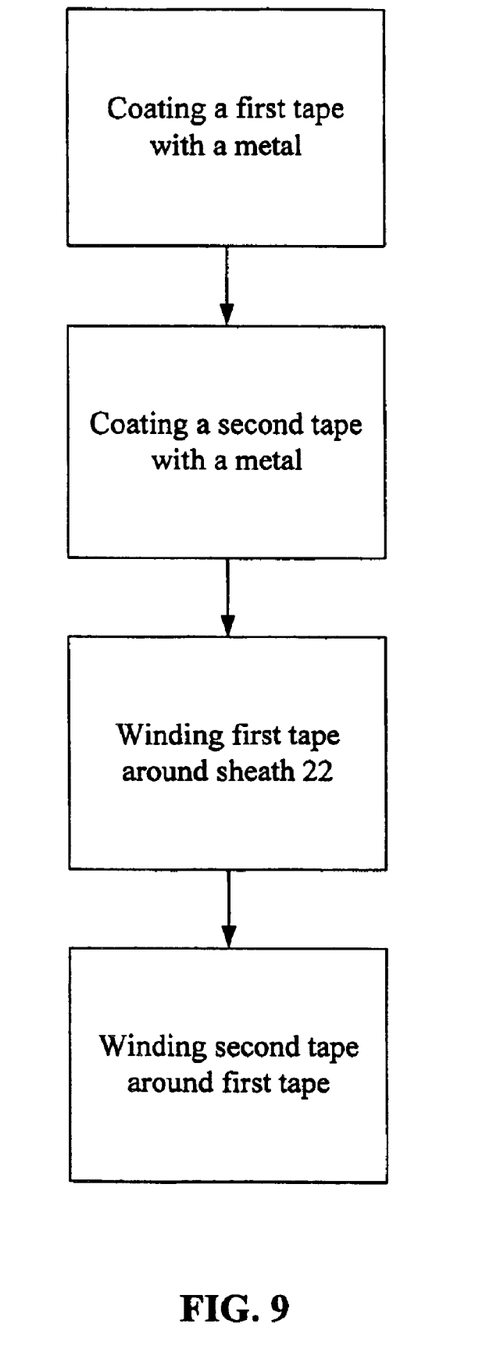
FIG. 9 is a flow chart illustrating a method of manufacturing a flexible pipe, according to yet another embodiment.

FIG. 9 is a flow chart describing a method of manufacturing a flexible pipe from plural metal strips, according to one embodiment. As shown, the method includes coating a first tape with a metal, coating a second tape with a metal, helically winding the first tape around the sheath 22, and helically winding the second tape around the first tape.

Thus, the high cost of the braiding and armoring machines used to apply a plurality of braided or woven fibers of extruded polymers, graphite or glass is avoided, since the pipe of FIG. 2 utilizing the tapes described above can be manufactured by relatively simple machines.

Variations and Equivalents

It is understood that variations may be made in the above without departing from the scope of the invention. For example, although the term "flexible" pipe has been used above, it is understood that the above embodiments are equally applicable to relatively rigid structures. Also, although the term "pipe" has been use throughout, it is understood that the above embodiments are equally applicable to similar structure, such as hoses, conduits, tubes, lines, and other types of tubular members. Similarly, although the term "fibers" has been used throughout, it is understood that the above embodiments are equally applicable to similar elements, such as threads, wires, and the like. Also, the tape 10' can be omitted and the strip 14 in the tape 10 of FIG. 1 may be formed by a material other than the slit polymers as discussed above. Further, in the tapes 10 and 30 of FIGS. 1 and 3, the fibers 12 can be supported and oriented individually with respect to the strip 14 or matrix 32, respectively, as shown in the drawings, or they can be stranded or twisted together and attached to the strip or matrix in groups, or bundles, and the latter groups or bundles can also be stranded or twisted together to form larger groups or bundles. Moreover, the above-mentioned coating for the fibers 12 can be omitted.

It is also understood that one or both of the tapes 10 and 10' can be formed by a plurality of strips 14 disposed in a side-by-side relationship. Also, the tapes 10, 10', 30, and 40 can be used in any combination and in any number of layers to form the pipe 20. Further, the inner sheath 22 and/or the outer sheath 24 may be omitted from the pipe 20 and the pipe may include one or more intermediate metal layers, polymeric sheaths and/or helically wound plastic material layers as also disclosed in the above-identified patent application. Still further, one or more of the tapes 10, 10', 30 and 40 can be attached, such as by bonding, or the like, to its adjacent tape(s), or the tapes can be fabricated with minimal or no adhesion between adjacent tapes. Also, one or more of the tapes 10, 10', 30 and 40 can be formed by multiple strands of tape. Moreover, spatial references, such as "outer", "over", "around", "inner", and "surrounding" are for the purpose of illustration only and do not limit the specific orientation or location of the materials described above.

Other modifications, changes, and substitutions are intended in the foregoing disclosure within the scope of the invention.

What is claimed is:

1. A flexible pipe, comprising:
    a tubular sheath defining a longitudinal passage for receiving a fluid;
    a plurality of layers extending around the tubular sheath,
    at least one of the layers comprising a preformed strip of flexible material and a plurality of metal fibers supported by the strip; and
    at least one of the layers comprising a substantially flat metal strip.

2. The pipe of claim 1 wherein at least one of the layers comprises a strip of flexible material and a plurality of metal fibers bonded to a surface of the strip, and wherein at least one of the layers comprises a strip of flexible material and a plurality of metal fibers embedded in the strip.

3. The pipe of claim 1 wherein at least one of the layers is an inner layer that is helically wound on the sheath and wherein each additional layer is helically wound on its adjacent inner layer.

4. A flexible pipe, comprising:
    a tubular sheath defining a longitudinal passage for receiving a fluid;
    a first preformed tape helically wound around the sheath and comprising at least one strip of flexible material, and a plurality of metal fibers supported by the strip;
    a second preformed tape helically wound around the first tape and comprising at least one strip of flexible material, and a plurality of metal fibers supported by the strip;
    the fibers of at least one tape being bonded to its adjacent tape or sheath.

5. A flexible pipe, comprising:
    a tubular sheath defining a longitudinal passage for receiving a fluid;
    a first preformed tape helically wound around the sheath and comprising at least one strip of flexible material, and a plurality of metal fibers bonded to the surface of the strip; and
    a second preformed tape helically wound around the first tape and comprising at least one strip of flexible material, and a plurality of metal fibers bonded to the surface of the latter strip.

6. A flexible pipe, comprising:
    a tubular sheath defining a longitudinal passage for receiving a fluid;
    a first preformed tape helically wound around the sheath and comprising at least one strip of flexible material, and a plurality of metal fibers bonded onto the strip and extending in the longitudinal direction of the strip; and
    a second preformed tape helically wound around the first tape and comprising at least one strip of flexible material, and a plurality of metal fibers bonded onto the strip and extending in the longitudinal direction of the strip.

7. The pipe of claim 4, 5 or 6 further comprising an outer sheath extending over the second tape.

8. The pipe of claim 5 or 6 wherein at least one tape is bonded to its adjacent tape or sheath.

9. The pipe of claim 6 wherein the fibers of at least one tape are bonded to a surface of their corresponding strip.

10. The pipe of claim 6 wherein the fibers of at least one tape are embedded in their corresponding strip.

11. The pipe of claim 6 wherein the fibers of each tape are bonded to their corresponding strip.

12. The pipe of claim 4 or 5 wherein the fibers of each tape extend in the longitudinal direction of their corresponding strip.

13. The pipe of claim 4, 5, or 6 wherein the second tape is wound in an opposite direction from that of the first tape.

14. The pipe of claim 4, 5, or 6 further comprising a protective coating on at least a portion of the fibers.

15. A method of manufacturing a flexible pipe, comprising:
   providing a tubular inner sheath defining a longitudinal passage for receiving a conveyed fluid;
   bonding a plurality of metal fibers to a surface of a strip of flexible material to form a tape; and
   winding the tape around the sheath.

16. A method of manufacturing a flexible pipe, comprising:
   providing a tubular inner sheath defining a longitudinal passage for receiving a conveyed fluid;
   embedding a plurality of metal fibers in a strip of flexible material to form a tape, the step of embedding comprising:
      pulling the fibers through an extruder; and
      applying a molten plastic material to the fibers; and
   winding the tape around the sheath.

17. The method of claim 15 or 16 wherein the tape is helically wound around the sheath.

18. The method of claim 15 or 16 further comprising the step of coating the fibers with a protective coating.

19. The method of claim 15 or 16 further comprising supporting an additional plurality of metal fibers by an additional strip of flexible material to form an additional tape, and winding the additional tape around the first-mentioned tape.

20. The method of claim 19 wherein the additional tape is helically wound around the first-mentioned tape.

21. The method of claim 19 wherein the additional tape is wound in an opposite direction from that of the first-mentioned tape.

22. The method of claim 19 further comprising providing an outer sheath over the additional tape.

23. A method of manufacturing a flexible pipe, comprising:
   providing a tubular sheath defining a longitudinal passage containing a conveyed fluid;
   coating a first, substantially flat tape with a metal;
   coating a second, substantially flat tape with a metal;
   helically winding the first tape around the sheath; and
   helically winding the second tape around the first metallic tape.

24. The method of claim 23 further comprising supporting an additional plurality of metal fibers by an additional strip of flexible material to form an additional tape, and winding the additional tape around the second tape.

25. The method of claim 24 wherein the additional tape is helically wound around the second tape.

26. The method of claim 24 wherein the additional tape is wound in an opposite direction from that of the second tape.

27. The method of claim 24 further comprising providing an outer sheath over the additional tape.

* * * * *

UNITED STATES PATENT AND TRADEMARK OFFICE
CERTIFICATE OF CORRECTION

PATENT NO. : 6,899,140 B2
DATED : May 31, 2005
INVENTOR(S) : Fraser et al.

It is certified that error appears in the above-identified patent and that said Letters Patent is hereby corrected as shown below:

Column 2,
Line 42, "farm" should be -- form --.

Column 3,
Line 9, "For example." should be -- For example, --.

Signed and Sealed this

Thirteenth Day of September, 2005

JON W. DUDAS
*Director of the United States Patent and Trademark Office*